Dec. 11, 1951 C. A. MILLER ET AL 2,578,081
DENTAL TOOL SHARPENING DEVICE
Filed July 20, 1948 3 Sheets-Sheet 1

Chant A. Miller
Samuel L. Border
INVENTORS

BY *[signatures]*
Attorneys

Dec. 11, 1951 C. A. MILLER ET AL 2,578,081
DENTAL TOOL SHARPENING DEVICE
Filed July 20, 1948 3 Sheets-Sheet 2

Chant A. Miller
Samuel L. Border
INVENTORS

Dec. 11, 1951 C. A. MILLER ET AL 2,578,081
DENTAL TOOL SHARPENING DEVICE
Filed July 20, 1948 3 Sheets-Sheet 3

Chant A. Miller
Samuel L. Border
INVENTORS

Patented Dec. 11, 1951

2,578,081

UNITED STATES PATENT OFFICE 2,578,081

DENTAL TOOL SHARPENING DEVICE

Chant A. Miller, Winamac, and Samuel L. Border, Monon, Ind.

Application July 20, 1948, Serial No. 39,598

2 Claims. (Cl. 51—59)

The present invention relates to new and useful improvements in tool or instrument holding and sharpening devices and more particularly to a device of this character for sharpening dental instruments.

An important object of the invention is to provide a dental tool sharpening device for holding and sharpening various types of tools and embodying means for holding the tool or instrument at a proper angle with respect to a reciprocating sharpening stone to effect the sharpening thereof.

Another object of the invention is to provide a tool holder embodying means for adjusting the angle of the tool longitudinally as well as transversely of a reciprocating sharpening stone in accordance with the bevel of the tool to maintain the original bevel of the tool during the sharpening action and to provide dials to indicate both the longitudinal and transverse angle of the tool.

Another object of the invention is to provide a longitudinally adjustable tool holder for placing the tool at a proper starting point with respect to the reciprocating stone during the sharpening process.

A still further object of the invention is to provide a manually operated reciprocating sharpening stone with means connecting a rockable tool supporting arm to the reciprocating mechanism whereby a tool is lowered into a sharpening position at one end of the stone at the beginning of its sharpening stroke and to raise the tool out of contact with the stone during its return stroke.

A still further object is to provide an apparatus of this character of simple, practical and compact construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
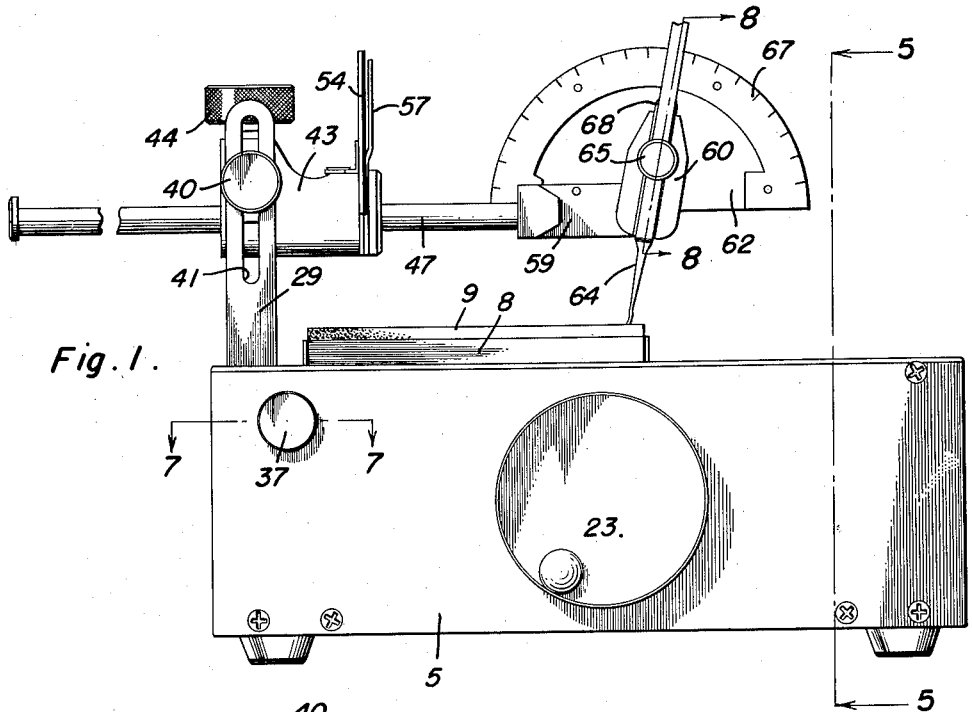
Figure 1 is a side elevational view.
Figure 2:
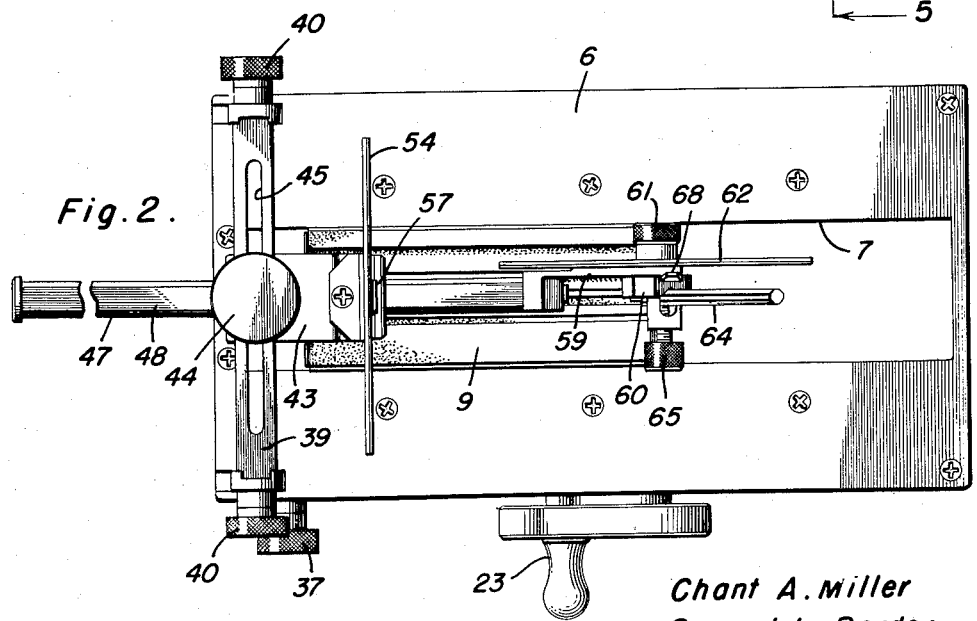
Figure 2 is a top plan view.
Figure 3:
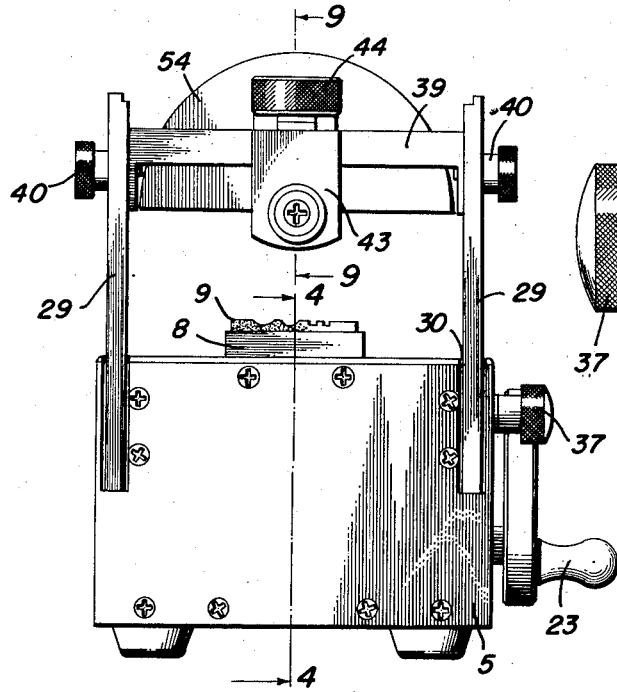
Figure 3 is an end elevational view.
Figure 7:
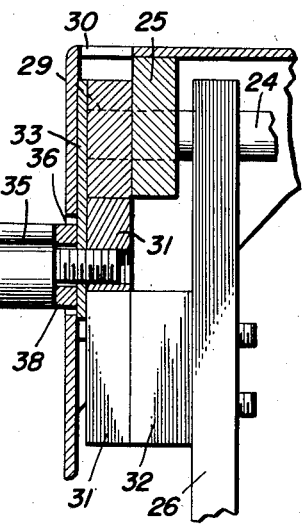
Figure 7 is an enlarged fragmentary sectional view of the stop limiting the rocking movement of the tool holder and taken substantially on a line 7—7 of Figure 1.

Referring now to the drawings in detail wherein for the purpose of illustration we have disclosed a preferred embodiment of the invention the numeral 5 designates a substantially rectangular shaped hollow base or housing having a top 6 provided with a longitudinal slot 7 to provide a table in which a sharpening stone tray 8 is positioned for reciprocating movement in the slot, the tray supporting a sharpening stone 9 therein and formed in its surface with longitudinal grooves 10 shaped to accommodate various sizes and types of tools to be sharpened.

The tray 8 is suitably secured on top of a slide 11 of laminated construction to the corners of which rollers 12 are journaled for traveling in tracks 13 secured to the underside of top 6 at each side of the slot 7.

A bar 14 is suitably secured to the underside of slide 11 in a transverse position and is formed with a slot 15 extending transversely of the slide to provide a track in which a roller 16 travels, the roller being supported on the upper surface at the free end of a horizontally swinging arm 17 which is secured at its other end to the upper end of a vertical shaft 18 secured in a substantially rectangular frame 19 supported in an upright position in the base 5.

A bevel gear 20 is secured to shaft 18 and is driven by a bevel gear 21 secured on the inner end of a horizontal shaft 22 journaled in the frame 19 and extending outwardly through one side of the base 5 and to the outer end of which is secured a handle 23.

A stationary shaft 24 is supported in a pair of hangers 25 at one end of the base 5 with a rocker arm 26 pivoted at one end to the shaft and extending longitudinally in the base with its free end riding on a cam 27 secured to shaft 22. A coil spring 28 attached to the underside of rocker arm 26 holds its free end downwardly on the cam.

A pair of posts 29 are pivoted at their lower ends on the end portions of shaft 24 and project upwardly through slots 30 in the top and in the adjacent end portion of the base 5 for forward and rearward rocking movement of the posts. An L-shaped block 31 and spacing block 32 are secured to rocker arm 26 and a substantially semi-circular plate 33 is suitably secured to the lower end of an adjacent post 29 with an arcuate slot 34 therein to receive a set screw 35 projecting through an opening 36 in the adjacent side of the base and threaded into the upstanding portion of the L-shaped block 31. A knurled knob 37 is formed on the outer end of set screw 35 and a washer 38 is carried by the set screw to bear against the plate 33 to lock the post in a limited swinging movement to rocker arm 26, the opening 36 being of sufficient diameter to permit movement of set screw 35 during limited rocking movement of the post.

The upper ends of posts 29 are connected to each other for uniform rocking movement by a cross bar 39 in the ends of which set screws 40 are threaded working in vertical slots 41 in the upper ends of the posts to secure the cross bar in vertically adjusted position on the posts.

The cross bar is seated in a groove 42 at the top of a guide block 43 which is secured to the cross bar and adjustable transversely of table or top 6 by a set screw 44 freely positioned in a slot 45 in the cross bar and threaded downwardly into a bushing 46 suitably secured in block 43.

A dental tool supporting arm 47 is slidable and rotatable in the block 43 and bushing 46, the arm being rounded in cross section and having a flat side 48 against which is held a stationary filler strip 49 by means of an internal pin 50 carried by a bushing 51 rotating in the block, the bushing 51 having a circumferential groove 52 receiving a set screw 53 to hold the bushing against endwise movement. The filler strip 49 restores the rounded contour of the position of arm 47 positioned in block 43.

A semi-circular dial plate 54 is secured in a fixed position to the front end of block 43 by a bracket 55 and is provided at its front face with a scale 56 graduated in degrees. A pointer 57 is secured to a flange 58 at the front end of bushing 51 for swinging the pointer around the scale 55 upon rotation of arm 47.

Figure 8:
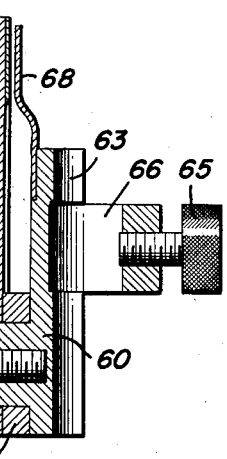
Figure 8 is an enlarged fragmentary vertical sectional view of the tool clamp for the tool holder and the indicating scale for the longitudinal angle of the tool and taken substantially on a line 8—8 of Figure 1.
Figure 9:
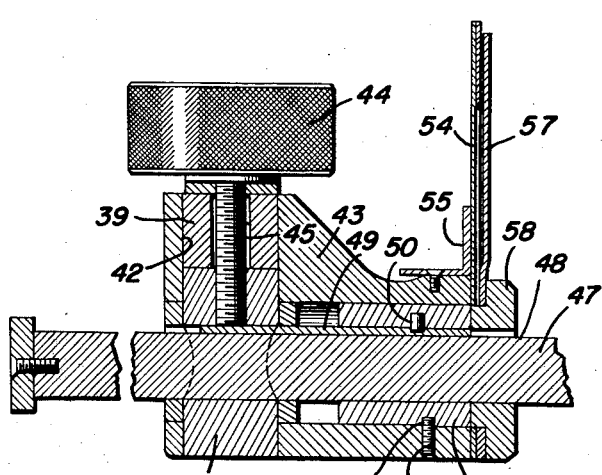
Figure 9 is an enlarged sectional view of the transverse angle adjusting means and indicating scale for the tool holding arm taken substantially on a line 9—9 of Figure 3; and, Figure 10 is a perspective view of the rotating bushing for the tool supporting arm.
Figure 4:
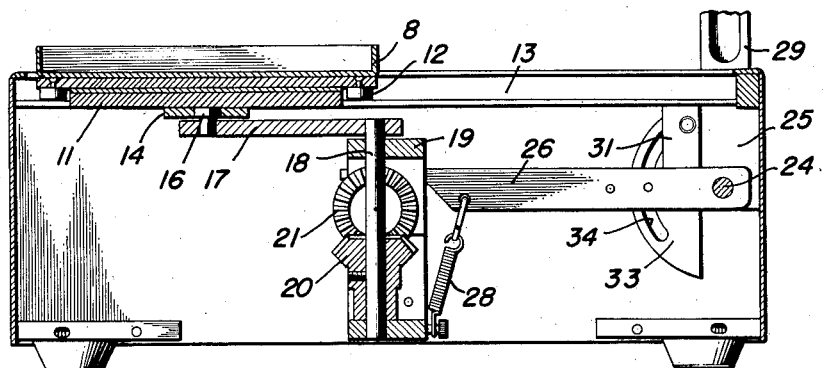
Figure 4 is a longitudinal sectional view through the housing or table for the reciprocating stone taken substantially on a line 4—4 of Figure 3.
Figure 5:
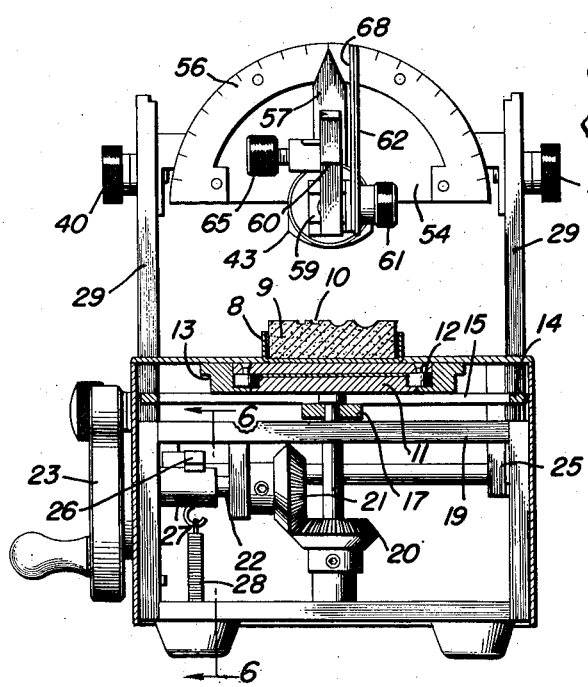
Figure 5 is a transverse sectional view taken substantially on a line 5—5 of Figure 1.
Figure 6:
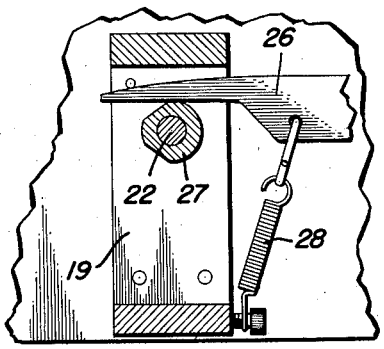
Figure 6 is an enlarged fragmentary sectional view taken on a line 6—6 of Figure 5 and showing the cam for rocking the tool holder.
Figure 10:
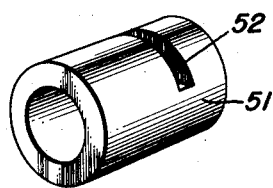

A bracket 59 is secured to the front end of arm 47 to one side of which a tool holder 60 is secured for vertical swinging movement by means of a set screw 61 whose head binds against the rear of a semi-circular dial plate 62 fixed to bracket 59, as shown more clearly in Figure 8, and positioned parallel to arm 47.

The tool holder 60 is formed with a groove 63 in its outer surface in which a dental instrument 64 is clamped in vertically adjusted position by a thumb nut 65 threaded in a guide 66 bridging the groove. The front face of dial plate 62 is provided with a scale 67 graduated in degrees and a pointer 68 is suitably secured to tool holder 60 to project upwardly therefrom for swinging around scale 67 upon adjustment of the tool holder.

In the operation of the device, a dental instrument 64 is clamped in groove 63 of tool holder 60 in a position for the engagement of the lower end of the instrument with sharpening stone 9.

The tool holder is adjusted to incline the instrument at a proper angle either forwardly or rearwardly and also transversely in accordance with the established angle or bevel of the instrument, the longitudinally inclined position of the instrument being determined by the reading of pointer 57 on scale 56. The instrument is adjusted in its longitudinally inclined position by swinging the tool holder 60 on its pivot and locking the same by set screw 61, and the instrument is adjusted in its transversely inclined position by rotating arm 47 in block 43 and locking the same by set screw 44.

The instrument may also be adjusted longitudinally and transversely with respect to its starting position on stone 9 by sliding the arm 47 in block 43 and by sliding block 43 on cross bar 39, both of such adjustments being held by set screw 44. The block 43 and tool holding arm 47 may be adjusted vertically in posts 29 by raising or lowering cross bar 39.

With the instrument 64 held in its proper starting position with respect to sharpening stone 9, handle 23 is rotated in a proper direction to rotate shafts 18 and 22, the shaft 18 swinging arm 17 horizontally to slide tray 8 and sharpening stone 9 in a reciprocating movement in guides 13 of head 9 of the base 5.

As the instrument 64 reaches the end of stone 9, cam 27 on shaft 22 will raise rocker arm 26 to swing posts 29 rearwardly to thus raise the instrument out of contact with the stone and to hold the instrument in its raised position during return stroke of the stone, and at the completion of such return stroke the spring 28 will lower rocker arm 26, swing posts 29 forwardly and again lower instrument 64 to contact the stone.

The raising and lowering movement of the instrument during reciprocating movement of the stone is slight and the posts 29 may be released from rocker arm 26 by releasing set screw 37 and the posts manually swung rearwardly to raise arm 47 and instrument 64 a desired height for inspection of the instrument and for removal and replacing other instruments in the holder.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A tool sharpener comprising a reciprocable sharpening stone, a pair of upstanding rockable supports adjacent one end of the stone, a cross bar connecting the upper ends of the supports to each other, a tool supporting arm, an arm holding member slidably carried by the cross bar and in which the tool supporting arm is slidably and rotatably positioned, and a tool holder pivotally mounted at one end of the arm.

2. A tool sharpener comprising a hollow base, a sharpening stone slidably supported on the base, an upstanding rockable support pivoted to the base adjacent one end of the stone, a tool supporting arm, means carried by the upstanding support slidably and rotatably supporting the arm above the stone, mechanism in the base reciprocably actuating the stone and including a shaft, a rocker arm pivoted at one end in the base, cam means on the shaft actuating the rocker arm, and connecting means between the rocker arm and the upstanding support to raise and lower the tool supporting arm in timed relation to the movement of the stone, said connecting means including means on the outside of the base for releasing the upstanding support for manual rocking movement thereof.

CHANT A. MILLER.
SAMUEL L. BORDER.

REFERENCES CITED

The following references are of record in the file of this patent:

UNITED STATES PATENTS

| Number | Name | Date |
|---|---|---|
| 1,411,713 | Downing | Apr. 4, 1922 |
| 1,605,784 | Schmitt | Nov. 2, 1926 |
| 2,165,929 | Lentz | July 11, 1939 |
| 2,391,260 | Miller et al. | Dec. 18, 1945 |